United States Patent

Hermann et al.

[15] 3,699,183
[45] Oct. 17, 1972

[54] HIGH MOLECULAR WEIGHT POLYAMIDES WITH AN IMPROVED AFFINITY FOR ACID DYES MODIFIED WITH AMINO EPOXY COMPOUND

[72] Inventors: Karl-Heinz Hermann, Krefeld-Bockum; Schneider, Joachim, Krefeld-Uerdingen; Hans Rudolph, Krefeld-Bockum; Günter Nawrath, Dormagen, all of Germany

[73] Assignee: Farbenfabriken Bayer Aktiengesellschaft, Leverkusen, Germany

[22] Filed: Jan. 23, 1970

[21] Appl. No.: 5,367

[30] Foreign Application Priority Data

Feb. 1, 1969 Germany..........P 19 05 102.6

[52] U.S. Cl..............260/78 L, 260/78 R, 260/78 A, 260/78 SC
[51] Int. Cl. .............................................C08g 20/38
[58] Field of Search......260/78 R, 78 A, 78 L, 78 SC

[56] References Cited

UNITED STATES PATENTS 3,394,112  7/1968  Stoll et al. ................260/78 L
3,458,481  7/1969  Reichold et al. .........260/78 L
3,486,839  12/1969  Howald....................260/78 L

*Primary Examiner*—Harold D. Anderson
*Attorney*—Plumley & Tyner

[57] ABSTRACT

Modified high-molecular weight polyamides having chemically incorporated therein 0.01 to 10 percent by weight of a basic monoepoxy compound of the general formula:

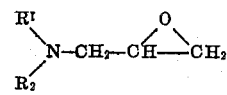

wherein $R_1$ and $R_2$, which may be different or not, each represents a $C_1$–$C_{20}$ aliphatic radical selected from the group consisting of an unsubstituted radical and a substituted radical containing functional groups inert to polyamides, a cycloalkyl radical, a benzyl radical, or $R_1$ and $R_2$, together with the nitrogen atom to which they are attached, form a heterocyclic ring; are provided which polyamides show an improved affinity for acid dyes.

1 Claim, No Drawings

HIGH MOLECULAR WEIGHT POLYAMIDES WITH AN IMPROVED AFFINITY FOR ACID DYES MODIFIED WITH AMINO EPOXY COMPOUND

This invention relates to modified high molecular weight polyamides with an improved affinity for acid dyes, and to a process for their production.

It is known that the receptivity of polyamides to acid dyes can be improved by adding free amines, for example aliphatic monoamines or diamines or heterocyclic amines, to the polyamide-forming starting materials before polycondensation, and thereby producing a larger number of terminal amino groups.

Unfortunately, polyamides obtained by this process contain a theoretical maximum of only two terminal amino groups per macromolecule, and even this theoretical value cannot be approached in practice. In addition, the maximum percentage terminal amino group content, and hence the affinity for acid dyes, decreases with increasing molecular weight of the polyamide.

In addition, it is known that organic phosphorus compounds, for example alkyl or aryl phosphinic acids or phosphoric or phosphonic acid esters, preferably in combination with diamines, can be added to polyamides before or during polycondensation. Unfortunately, some of these additives act as chain terminators, so that the quantity in which they are added is limited by the required molecular weight of the polyamide. In addition, they are washed out again to some extent during extraction of the polyamide, as is necessary, in the production of, for example, polycaprolactam in order to remove low molecular weight components. Another disadvantage of this process lies in the uncontrollable post-condensation of the polyamides during spinning, caused by catalytic quantities of a phosphorus compound which can lead to considerable difficulties in the production of polyamide fibers.

In addition, it is known that equivalent quantities of an aliphatic or aromatic dicarboxylic acid and of an aliphatic diamine with one or more secondary or tertiary amino nitrogen atoms in the chain can be added to the polyamide-forming starting materials before polymerization. Although the affinity of the polyamides for acid dyes can be considerably improved by such an addition, the physical properties of the polyamides, for example their melting points and water absorption, are simultaneously affected through the copolyamide formation caused by the addition.

In addition, the secondary and tertiary amino nitrogen atoms represent weak points in the polymer chain and thus promote degradation of the polyamide under the effect of heat or oxidation.

It is an object of this invention to provide polyamides which do not show the disadvantages outlined above.

This object is accomplished by a modified high molecular weight polyamide consisting of a polyamide having recurring carbonamide groups in the chain and having attached thereto in chemically bound form of from 0.01 to 10 percent by weight based on the polyamide, of a basic monoepoxy compound of the general formula

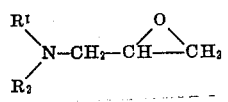

wherein $R_1$ and $R_2$, which may be different or not, each represents a $C_1$–$C_{20}$ aliphatic radical selected from the group consisting of an unsubstituted radical and a substituted radical containing functional groups inert to polyamides, a cycloalkyl radical, a benzyl radical, or $R_1$ and $R_2$, together with the nitrogen atom to which they are attached, form a heterocyclic ring.

It is another object of this invention to provide a process for the production of modified high molecular weight polyamides which comprises mixing 0.01 to 10 percent by weight, based on the polyamide, of a basic monoepoxy compound of the general formula

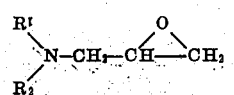

wherein $R_1$ and $R_2$, which may be different or not, each represents a $C_1$–$C_{20}$ aliphatic radical selected from the group consisting of an unsubstituted radical and a substituted radical containing functional groups inert to polyamides, a cycloalkyl radical, a benzyl radical, or $R_1$ and $R_2$, together with the nitrogen atom to which they are attached, form a heterocyclic ring, with a polyamide material and reacting said epoxy compound with the polyamide at a temperature above the melting point of the polyamide.

Polyamide materials in the context of this invention are polyamides and polyamide forming starting materials.

The hydroxyl group and the dialkylamino group are examples of functional groups that are inert to polyamides.

One major advantage of these modified polyamides is that the basic monoepoxy compounds added cannot be removed by washing with water because they are present in chemically bound form.

For example, the polyamides may contain the following basic monoepoxy compounds in chemically bound form:
N,N-dimethyl-1-amino-2,3-epoxy-propane; N,N-diethyl-1-amino-2,3-epoxy-propane; N,N-diisopropyl-1-amino-2,3-epoxy-propane; N,N-di-n-propyl-1-amino-2,3-epoxy-propane; N,N-diisobutyl-1-amino-2,3-epoxy-propane; N,N-di-n-butyl-1-amino-2,3-epoxy-propane; N-ethyl-N-butyl-1-amino-2,3-epoxy-propane; N,N-dicyclohexyl-1-amino-2,3-epoxy-propane; N,N-diheptyl-1-amino-2,3-epoxy-propane; N,N-didodecyl-1-amino-2,3-epoxy-propane; N,N-dibenzyl-1-amino-2,3-epoxy-propane; N-hydroxyethyl-N-cyclohexyl-1-amino-2,3-epoxy-propane; N-1,2-epoxypropyl-3-morpholine; N-1,2-epoxypropyl-3-thiomorpholine; N-1,2-epoxypropyl-3,N'-methyl piperazine; and N-1,2-epoxypropyl-3-hexamethylene imine.

The basic monoepoxy compounds are present in the modified polyamides in a quantity of from 0.01 to 10 percent by weight, and preferably in a quantity of from 0.1 to 5 percent by weight, based on the polyamide.

The modified polyamides according to the invention can be obtained, for example, by adding the basic monoepoxy compounds to the polyamide-forming starting materials before polymerization or polycondensation, and then completing polymerization in known manner, either continuously or in batches. However, it is preferred to mix the basic monoepoxy compounds with the polyamide melt either during or after polymerization or polycondensation and then to react them with the polyamide at temperatures above the melting point of the polyamide, for which purpose conventional mixing machines such as extruders, kneaders or stirrers may be used. As a result, the basic monoepoxy compounds are chemically bound to the polyamides. Since the basic monoepoxy compounds are usually liquids, they are especially suitable for continuous introduction in a continuous-cycle polymerization process carried out, for example, in a so-called VK-tube.

Polyamides in the context of the invention are those which contain recurring carbonamide groups in the chain and which are formed by polymerizing or polycondensing amino carboxylic acids or their lactams or diamines and dicarboxylic acids.

The modified polyamides according to the invention may also contain the usual additives such as pigments, dyes, light stabiliziers, heat stabilizers and weather stabilizers, optical brighteners, antistatic agents, lubricants and mould-release agents, plasticizers or crystallization promoters.

Compared with conventional polyamides, the modified polyamides according to the invention have a larger basic group content for the same molecular weight and hence show an improved affinity for acid dyes. They are eminently suitable, inter alia, for the production of filaments, fibers, silk and films which are dyed with acid dyes either subsequently or after further processing, for example into woven fabrics.

The following examples are to further illustrate the invention without limiting it.

EXAMPLE 1

A polycaprolactam melt obtained by continuously polymerizing ε-caprolactam in a conventional VK-tube, is mixed with a basic monoepoxy compound by means of a stirrer. The polycaprolactam melt has a temperature of around 265° C. After mixing, the melt is spun through spinerets into a water bath in the form of filaments approximately 3 mm in diameter.

The filaments are granulated by means of a conventional strand granulator, and the granulate is freed from monomeric components by extraction with boiling water and then dried.

Tests are carried out on the different polyamide samples to determine the following properties:
1. The relative viscosity of a 1 percent by weight solution in m-cresol at 25° C measured by means of an Ubbelohde viscosity meter.
2. The basic nitrogen content as determined by colorimetric titration of a solution in a mixture of phenol and methanol with perchloric acid.

The test results are set out in Table I.

It was found that the basic nitrogen content of the polycaprolactam, and hence its affinity for acid dyes, can be increased by from two to four times, and, if desired, to an even greater extent by the addition of basic monoepoxy compounds without any reduction in the relative solution viscosity.

TABLE I

| No. | Basic Monoepoxy Compound | %* | Rel. Visc. | Basic Nitrogen content % |
|---|---|---|---|---|
| 1 | N,N-di-n-butyl-1-amino-2,3-epoxy-propane | 1.0 | 2.68 | 0.10 |
| 2 | " | 2.0 | 2.66 | 0.15 |
| 3 | N,N-dicyclohexyl-1-amino-2,3-epoxy-propane | 2.5 | 2.66 | 0.15 |
| 4 | " | 3.75 | 2.67 | 0.22 |
| 5 | N-1,2-epoxypropyl-3-morpholine | 1.5 | 2.69 | 0.09 |
| 6 | " | 2.5 | 2.68 | 0.15 |
| 7 | — | — | 2.68 | 0.05 |

*Based on polyamide.

What we claim is:

1. Modified high molecular weight polycaprolactam consisting of polycaprolactam having recurring carbonamide groups in the polymeric chain reacted at a temperature above the melting point of the polycaprolactam, with 0.01 to 10 percent by weight based on the polycaprolactam of a basic, monoepoxy compound of the formula

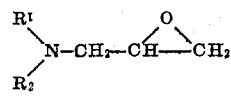

wherein $R_1$ and $R_2$, are the same or different members selected from the group $C_1 - C_{20}$ saturated aliphatic hydrocarbon radicals selected from the group consisting of an unsubstituted radical; a substituted radical containing functional groups chemically inert to the polycaprolactam, a cycloalkyl radical, a benzyl radical, or $R_1$ and $R_2$ together form, with the nitrogen atom to which they are attached, a heterocyclic ring.

* * * * *